(12) United States Patent
Kojori

(10) Patent No.: US 7,848,121 B2
(45) Date of Patent: Dec. 7, 2010

(54) ADVANCED MATRIX CONVERTER AND METHOD FOR OPERATION

(75) Inventor: Hassan Ali Kojori, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 322 days.

(21) Appl. No.: 12/118,589

(22) Filed: May 9, 2008

(65) Prior Publication Data

US 2008/0285314 A1 Nov. 20, 2008

Related U.S. Application Data

(60) Provisional application No. 60/917,871, filed on May 14, 2007.

(51) Int. Cl.
*H02M 5/45* (2006.01)
*H02M 5/458* (2006.01)
*H02H 7/122* (2006.01)

(52) U.S. Cl. ................... 363/37; 363/56.12

(58) Field of Classification Search ........... 363/34, 363/37, 123, 56.12
See application file for complete search history.

(56) References Cited

U.S. PATENT DOCUMENTS

| 4,438,486 | A | | 3/1984 | Ferraro | |
| 4,697,230 | A | * | 9/1987 | Neft | 363/163 |
| 5,949,672 | A | * | 9/1999 | Bernet | 363/159 |
| 6,404,173 | B1 | * | 6/2002 | Telefus | 323/272 |
| 6,771,524 | B2 | * | 8/2004 | Miguchi | 363/149 |
| 7,079,363 | B2 | * | 7/2006 | Chung | 361/13 |
| 7,180,759 | B2 | * | 2/2007 | Liptak et al. | 363/56.08 |
| 2007/0252565 | A1 | * | 11/2007 | Wang et al. | 323/277 |

OTHER PUBLICATIONS

Wheeler P W, Rodriguez J, Clare J C, Empringham L and Weinstein A, "Matrix converters: a technology review", IEEE. Transactions on Industrial Electronics, vol. 49, No. 2, pp. 276-288, Apr. 2002.

* cited by examiner

*Primary Examiner*—Adolf Berhane
*Assistant Examiner*—Emily Pham
(74) *Attorney, Agent, or Firm*—Oral Caglar, Esq.

(57) ABSTRACT

A matrix converter may be provided with AC switches that comprise bi-directional sets of semiconductor switches that are gated with a common gating link. A low loss diode-bridge based snubber may facilitate introduction of time delay between sequential operations of the bi-directional set of semiconductor switches. The matrix converter may be operated in a three-phase mode with only one gating signals for each AC switch, in contrast to prior-art matrix converters which may require use multiple gating signals for each AC switch.

11 Claims, 10 Drawing Sheets

ADVANCED MATRIX CONVERTER AND METHOD FOR OPERATION

CROSS-REFERENCE TO RELATED APPLICATIONS

This application claims the benefit of U.S. Provisional Application No. 60/917,871 filed May 14, 2007 which is incorporated by reference herein.

BACKGROUND OF THE INVENTION

The present invention is in the field of electrical power system control and, more particularly, control for Variable Speed Constant Frequency (VSCF) Electric Power Systems (EPS).

In aircraft electrical power systems, power may be generated by electric machines that may be driven by prime movers such as aircraft engines. These prime movers may rotate at varying speeds and may cause their respective electric machines to produce electrical power at varying frequency. Variable frequency power generation (e.g., 360 to 800 Hertz (Hz)), may not be directly useful for supplying power to frequency sensitive loads.

Various techniques may be employed to produce a substantially constant frequency in these above-described aircraft generating systems. Such techniques may include Integrated Drive Generators (IDG) to maintain the speed constant; two-stage power conversion systems (AC-DC-AC) for frequency conversion to a constant 400 Hz where a transformer-coupled passive rectifiers or more advanced systems such as 12, 18, 24 pulse autotransformer rectifier Unit (ATRU) are used for the front-end AC-DC conversion. IDG subsystems are heavy, expensive and due to their complex high-speed rotating mechanical structure, require frequent costly maintenance. The alternative solution based on a transformer-coupled passive front-end rectifier, is also bulky, heavy, expensive and due to two stages of power conversion, the efficiency is negatively impacted.

In an effort to reduce weight and expense as well as decrease maintenance requirements, various matrix converters along with pulse-width modulation (PWM)-based control algorithms have been proposed in the prior-art. Prior-art matrix converter power topologies may include nine bi-directional alternating current (AC) switches used to connect input AC-system phases directly to a three-phase load. Switching of these bi-directional AC switches may be then PWM modulated to produce the desired output voltage and frequency, as required by the load.

These prior-art matrix converters may offer many theoretical advantages such as the ability to regenerate energy back to the utility, sinusoidal input and output currents, controllable input current displacement factor and an overall reduced size. However, numerous severe technical limitations and failure modes have prevented any practical use of these conventional matrix converters in the aerospace and general industry. Some of these limitations include a) Commutation failures at turn-on and turn-off of switching devices resulting in various component and system level failure modes; b) Due to presence of lay-out inductances in the power-path, significant over-voltages will appear across the switching devices. Conventional methods of passive snubbers or voltage clamps will significantly slow-down the switching times and result in excessive losses; c) direct-coupling of input/output AC system normal and abnormal transients from source to load and vice versa, resulting in significant overstress of key components of the system which may result in their failure; d) Complex and unreliable control algorithm and gating patterns fail to ensure safe and reliable operation under all modes of operation—particularly, during fault modes where software-based mitigation of commutation process is not possible; e) Severe resonance problems associated with input and/or output filters depending on the power topology and configuration; and f) Excessive losses due to selection of AC-Switches which requires significant dead-time, resulting in significant power flow to the active-clamps. These losses result in poor efficiency.

Particularly, the following references show problems and propose complex mitigating methods. 1. Jochen Mahlein, Mark Nils Muenzer, and Manfred Bruckmann, "Modern Solutions for Industrial Matrix-Converter Applications", IEEE TRANSACTIONS ON INDUSTRIAL ELECTRONICS, VOL. 49, NO. 2, APRIL 2002 401. 2. Jochen Mahlein, Jens Igney, Jörg Weigold, Michael Braun, and Olaf Simon, "Matrix Converter Commutation Strategies With and Without Explicit Input Voltage Sign Measurement", IEEE TRANSACTIONS ON INDUSTRIAL ELECTRONICS, VOL. 49, NO. 2, APRIL 2002 407. 3. P. Nielsen, F. Blaabjerg, J. K. Pedersen, "New Protection Issues of a Matrix Converter—Design Considerations for Adjustable Speed Drives". IEEE Trans. on Industry Applications, Vol. 35, no. 5. pp 1150-1161, 1999. 4. Ziegler, M. Hofmann, W., "Implementation of a two steps commutated matrix converter", Power Electronics Specialists Conference, 1999. PESC 99. 30th Annual IEEE, August 1999, Vol. 1, pp 175-180. 5. Alesina, A.; Venturini, M. G. B., "Analysis and design of optimum-amplitude nine-switch direct AC-AC converters", Power Electronics, IEEE Transactions on, Volume 4, Issue 1, January 1989 Page(s):101-112. 6. Huber, L.; Borojevic, D., "Space vector modulated three-phase to three-phase matrix converter with input power factor correction", Industry Applications, IEEE Transactions on Volume 31, Issue 6, November-December 1995 Page(s):1234-1246.

As can be seen, there is a need to provide advanced matrix converters to overcome these problems so that they may be used safely, reliably and efficiently for various applications in aircraft power systems and general industry.

SUMMARY OF THE INVENTION

In one aspect of the present invention a matrix converter comprises a plurality of at least N×M bi-directional AC switches capable of conducting current in both directions during the on-position and blocking an AC voltage during the off-position, where N corresponds to the number of AC system phases at the input and M corresponds to the number of required phases at the output. Each AC Switch may be comprised of multiple switching devices all with the same common gating pattern, minimizing the requirements for isolated gate driver circuits.

In another aspect of the present invention commutation failures are avoided by introducing an active-snubber-circuit comprised of a full diode-bridge, a capacitor and either an Energy Reset or an Energy Recovery Circuit. The active-snubber-circuit may be connected across each of the AC switches, hence providing a path for the flow of load current during transfer of current from one AC switch to another. Furthermore, a time-delay unit may be used for each AC switch to enforce a dead-time disabling gating to all the N switches of a particular phase (there may be M of these phases made-up of N switches each) during current transfer from one AC switch to the other. Hence, this aspect may ensure safe and reliable transfer of currents from one AC switch to another without short circuiting the supply or open circuiting the load current.

In another aspect of this invention, a modular control algorithm is described for sequentially modulating the N×M AC switches to achieve regulated voltage and frequency output as per a given set reference for each of the M output phases, particularly in light of the time-delay between sequential operations, and the snubber absorbing energy during the time delay.

In still another aspect of the present invention embodiments for the power topology and control algorithm/method for an advanced matrix converter are described for providing conditioned electrical power at a controlled voltage and frequency from a variable voltage variable frequency source comprises the steps of supplying AC power to the said matrix converter unit, operating multiple AC switches; and introducing a time-delay and energy reset/recovery circuits for successive operations of the semiconductor switches without commutation failures (i.e., to preclude short-circuiting the supply or open circuit conditions at an output of the matrix converter) and introducing input and filtering for meeting power quality and EMI requirements.

In still another aspect of the present invention embodiments for providing power to a three phase unbalanced load is described.

In still another aspect of the present invention embodiments is shown for active filtering and damping to reduce filtering requirements and improve overall efficiency.

These and other features, aspects and advantages of the present invention will become better understood with reference to the following drawings, description and claims.

DETAILED DESCRIPTION OF THE INVENTION

Figure 1:
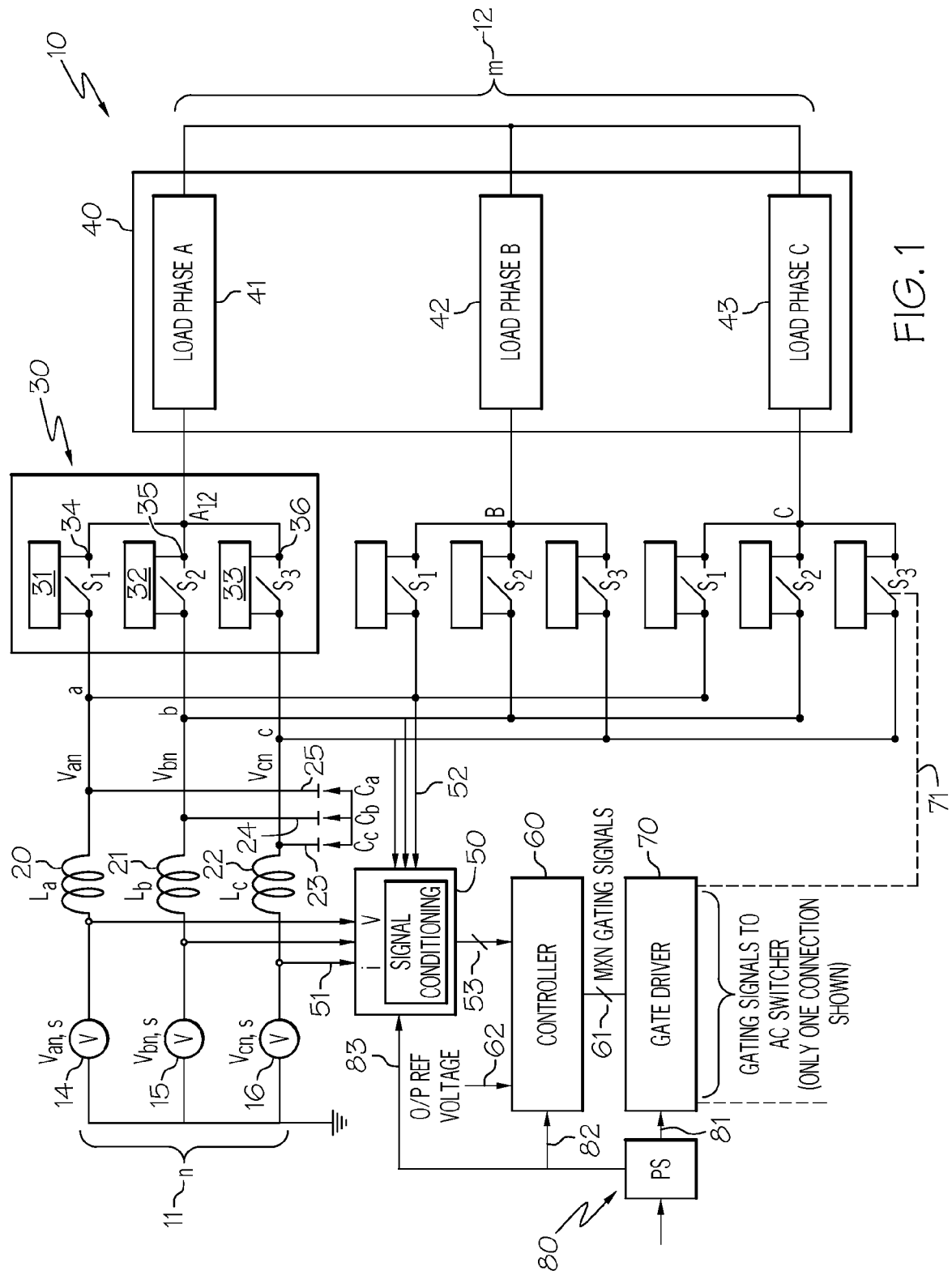
FIG. 1 is a schematic diagram showing a simplified power circuit and controls for an advanced matrix converter according to the present invention.

The following detailed description is of the best currently contemplated modes of carrying out the invention. The accompanying figures are simplified, not drawn to scale and are meant to include various direct AC-AC conversion applications with different electric power system input/output requirements. In the figures, each identical or substantially similar component that is illustrated in various figures may be represented by a single item or notation. Generalized control algorithms and block-diagrams are developed to reduce the number of figures required to show full operation. For purposes of clarity, not every component is labeled in every figure, nor is every component of each embodiment of the invention shown where illustration is not necessary to allow those of ordinary skill in the art to understand the invention. The description and accompanying figures are not to be taken in a limiting sense, but are made merely for the purpose of illustrating the general principles of the invention, since the scope of the invention is best defined by the appended claims.

Broadly, the present invention may be useful for power conditioning in electrical power systems where controllable voltage and frequency output power has to be obtained by conditioning variable voltage variable frequency (VVVF) input power for motor drive systems such as More Electric Aircraft (MEA) loads, or achieving a constant voltage constant frequency electric power supply such as Variable Speed Constant Frequency for aerospace and general industry. The present invention may be useful to effectively resolve the technical limitations outlined above for conventional matrix converters.

In contrast to prior-art (i.e., conventional matrix converters), among other things, the present invention provides the following additional benefits: a) direct AC-AC conversion, and at the same time a regulated auxiliary DC bus which can be used for active filtering damping and/or supplying DC power to other loads, as required; b) ride-through capability enabled by auxiliary DC bus voltage and ability to regenerate safely during input AC power interruption; c) improved efficiency (>96-98%); d) improved dynamic response based on novel control strategy over the output frequency, voltage and power transfer, with the main objective to prevent/minimize interactions between AC source and loads; e) increased voltage transfer ratio to near unity based on a novel space-vector modulation (SVM); f) improved form factor and reduced weight, volume, footprint and increased overall reliability through elimination of the DC link capacitor—these benefits could enable an "all-silicon" solution; and g) improved ease of manufacturing, troubleshooting and maintenance.

These and other benefits described in detail in the following sections when combined, would result in reduced weight, volume, cost and improved reliability of the power conditioning equipment as a component and are particularly advantageous when integrated into a MEA for aircraft or general industry where multiple such components can be used in a multi-functional mode for achieving optimum solution with respect to overall cost, weight, volume, reliability with maximum efficiency.

Referring now to FIG. 1, there is shown a block diagram of a matrix converter 10 in accordance with the invention. The matrix converter 10 may be constructed in a manner consistent with matrix converters of the prior art except that the matrix converter 10 may be provided with a unique type of AC switch for each of the M phases.

FIGS. 2A-2D show several options for the AC switch (e.g., blocks 31, 32, 33, described below with reference to FIG. 1), in which a common gating pattern can be used to simplify gating pattern generation. Each sub-device may be made of multiple devices in parallel and/or series (with proper circuits for current/voltage sharing, not shown) and for achieving rated current/voltage with proper integrated gate-driver circuits, active-snubber/energy recovery and protection/PHM circuits for safe and reliable operation (not shown in this diagram).

Figure 2A:
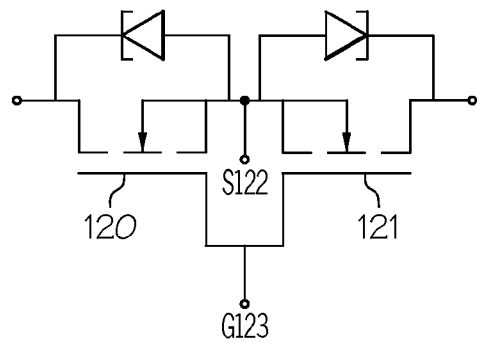
FIGS. 2A-2D are schematic diagrams showing different types of bi-directional AC switches useful in the present invention.
Figure 2B:
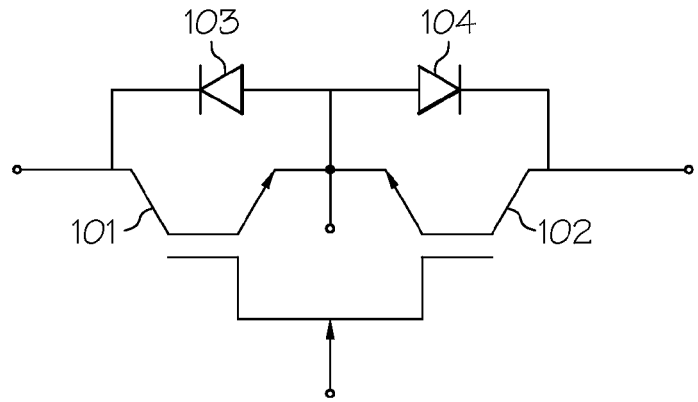
Figure 2C:
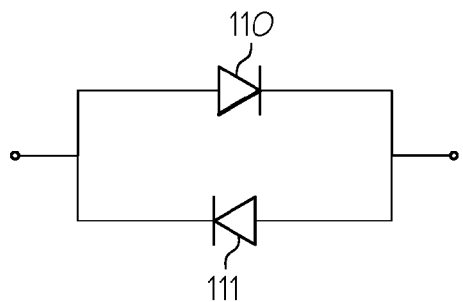
Figure 2D:
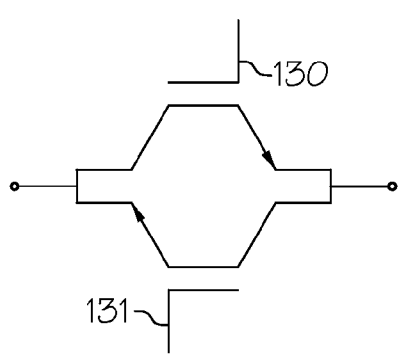

FIG. 2A, shows an AC switch comprised of two equivalent MOSFETs 120, 121 in common-source arrangement. Only one common gating and one gate-driver isolation circuitry may be required for both sub-devices. FIG. 2B shows an AC switch comprised of two equivalent IGBTs 101, 102 in common-source arrangement. Each IGBT 101, 102 may have an anti-parallel diode 103, 104. Only one common gating and one gate-driver isolation circuitry may be required for both sub-devices. FIG. 2C shows an AC switch comprised of two thyristors 110, 111 connected back-to-back with common gating; however, this AC switch may require isolated gating signal for driving each sub-device, FIG. 2D shows an AC switch comprised of two reverse-blocking-IGBTs 130, 131 connected back-to-back with common gating; however, this AC switch may require isolated gating signal for driving each sub-device.

Referring specifically to FIG. 2A, the use of multiple MOSFETs 120, 121 for each sub-device in parallel may result in reduction of Rds and conduction losses can be significantly reduced. Proper gate-driver design based on injecting high initial current to the multiple MOSFET devices in a current-source-mode may result in reducing switching times, hence enabling much higher switching frequency operation facilitating reduction in the weight and size of filtering. When putting multiple devices in parallel, control of lay-out and balancing equal stray-inductances in the path of parallel sub-devices may ensure equal current sharing.

Referring back to FIG. 1, operation of an advanced matrix converter (AMC) for 3-1 and 3-3 modes of operation is described. In accordance with the present invention S1 34, S2 35, S3 36 can be grouped together as a 3-1 switch block 30 for direct AC-AC conversion from a three phase system (i.e., with phases a, b and c) to power phase A 12, in which case for 3-1 AMC operation points n 11 (AC system ground) is connected to load neutral m 12. Only one AC switch from bock 30 can be closed at the same time (otherwise, there will be a short circuit of the corresponding AC system voltages). For reliable and safe operation and to avoid short-circuit commutation failure, a short-duration dead-time is introduced between switching times of outgoing and incoming devices. During this dead-time the active-snubber energy reset/recovery circuits across each AC Switch (i.e., blocks 31, 32 ad 33) may provide a bidirectional path for the load current and prevent open circuit of the load, which otherwise would result in very high over-voltages due to inductive load current chopping/interruption. A filter inductor $L_a$ 20 and a filter cap $C_a$ 25 are shown. Additional resistors could be used across inductors $L_a$, $L_b$ and $L_c$ for passive damping and are not shown. Furthermore, an RLC tuned filter (tuned to switching frequency, for example 20 kHz or 40 kHz etc) may be used to improve effectiveness of filtering higher order switching frequency current harmonics, not shown in the FIG. 1.

For a single phase load system (e.g., for phase A 41 in FIG. 1), the load can be supplied from a 3-1 matrix converter comprised of three AC voltages $V_{an,s}$ 14, $V_{cn,s}$ 15, $V_{an,s}$ 16, input filters, 3-1 AC switch 30, three input current, i 51, and three capacitor voltages, v 52 are measured and routed to a signal conditioning block 50, and then routed to a controller 60 (may include a microcontroller or DSP with or without an additional internal/external FPGA) which may generate M×N gating patterns 61 for the AC switches (in the case of a 3-1, a total of 3 gating signals). The gating signals may be routed to gate-drivers for isolation and proper voltage levels corresponding to the requirements of the individual AC switches during turn-on and turn-off. A Power Supply PS 80 may provide the required power consumption to blocks 50, 60 and 70.

Switching of these bidirectional AC switches may be PWM modulated to produce the desired output voltage and frequency as per an output reference voltage 62, as required by the load. Open-loop operation is shown, but those skilled in the art will appreciate these concepts could be easily extended to realize a closed loop system (for output voltage or sensor-less speed control of motor drives). This may require measuring additional output current and/or voltage signals and implementation of Phase-Lock-Loops (PLL), in the embodiment in the controller 60, as per previous inventions of same author, including U.S. Pat. Nos. 6,850,426 and 7,276,877, herein incorporated by reference.

Now referring back to FIG. 1, operation of an AMC for achieving a 3-3 (or in general for N×M) direct AC-AC conversion can be easily understood and appreciated by those skilled in the art.

As per another aspect of this invention, a common modular method algorithm and control method for implementation of gating patterns for an advanced matrix converter can be used. More complex gating patterns based on space vector modulation have been widely reported in the literature and can be adopted for the AMC to obtain a higher voltage transfer ratio and/or reduce filtering requirements for further improvement on power quality performance.

As can be understood from the above explanation, there is no need for sensing the direction of output load current or increasing the number of sectors from 6 to 12 by monitoring magnitude/polarity of the input AC voltage (i.e., 4-step and 2-step complex and unreliable gating pattern methods), as described in the prior art. The present invention may only require a common gating pattern, and this may significantly reduce the complexity of gating pattern generation. Furthermore, use of arrangements shown in FIG. 2A and 2B, may facilitate common isolation; i.e., only one gate-driver isolation is required for sub-devices (e.g., in case of FIG. 2A, G 123 and S 122 can be driven with only one isolated signal).

Figure 3A:
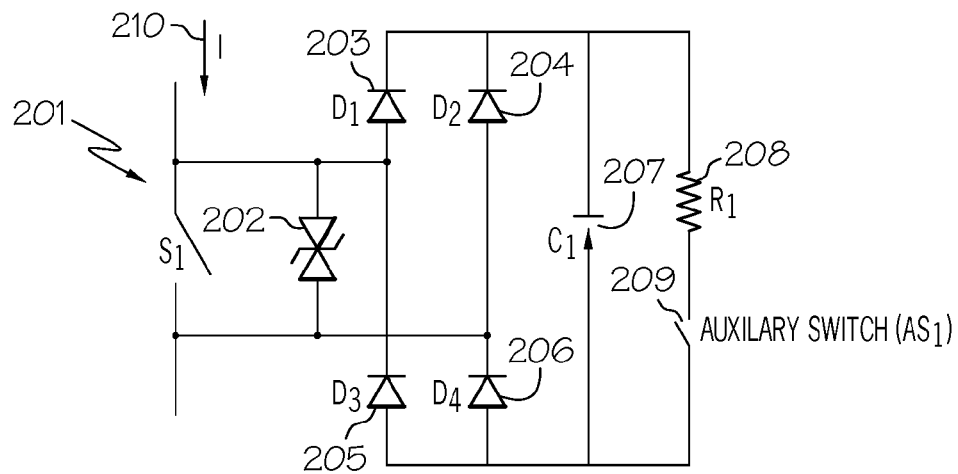
FIG. 3A is a schematic diagram showing an active snubber with a dissipation arm shown as $R_1$ plus an auxiliary switch, according to the present invention.
Figure 3B:
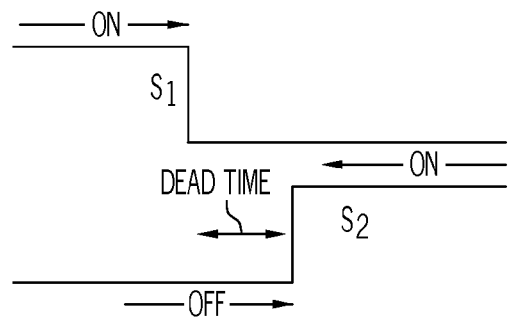
FIG. 3B shows gating signals during transfer of current, according to the present invention.
Figure 3C:
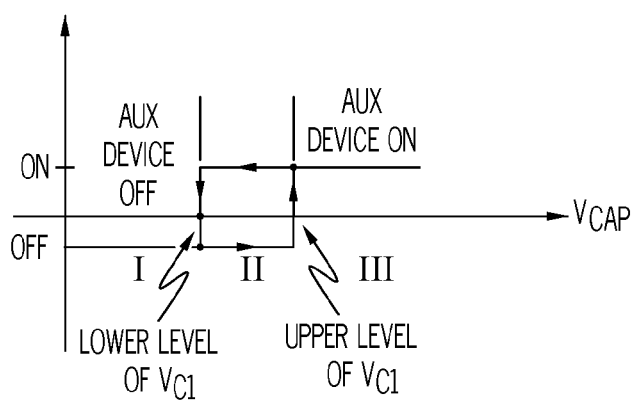
FIG. 3C shows bang-bang control of cap voltage, according to the present invention.

Referring now to FIG. 3A, one of the AC switches 201 along with integrated gate-driver circuits, active-snubber and energy recovery comprising D1 203 to D4 206 and capacitor C1 207 and energy reset circuit comprising R1 208 and auxiliary switch 209 (AS1) is shown in detail. FIG. 3B shows the gating pattern for a situation where S1 is to be turned-off and instead, S2 be turned-on. The AC Switch S1 201 may be one of those described in FIGS. 2A-2D. Bi-directional transorb 202 may be used for limiting voltage across the device for protection against excessive voltage transients. During dead-time, as shown in FIG. 3B, the current I can flow through the diodes into the capacitor C1 and commutation energy recovered. Capacitor voltage may be rest to zero, during every turn-on period, by closing the auxiliary switch and dissipating the recovered energy in R1. However, this may result in excessive losses, particularly for high power rating applications. Alternatively, the capacitor C1 may be fully discharged after every turn-on, but may be regulated at a higher voltage (typically at an average voltage above the AC system maximum line-line voltage plus a safety margin to allow for expected input AC power system over-voltage transients). This can be achieved through a simple bang-bang control method, where cap voltage is measured and energy is dissipated in the Resistor R1 if the capacitor voltage exceeds a predetermined upper voltage level by closing auxiliary switch AS1, and kept closed until the capacitor voltage drops below a predetermined lower voltage level. FIG. 3C shows a simplified description of the bang-bang control for regulating the Vc1.

Figure 4:
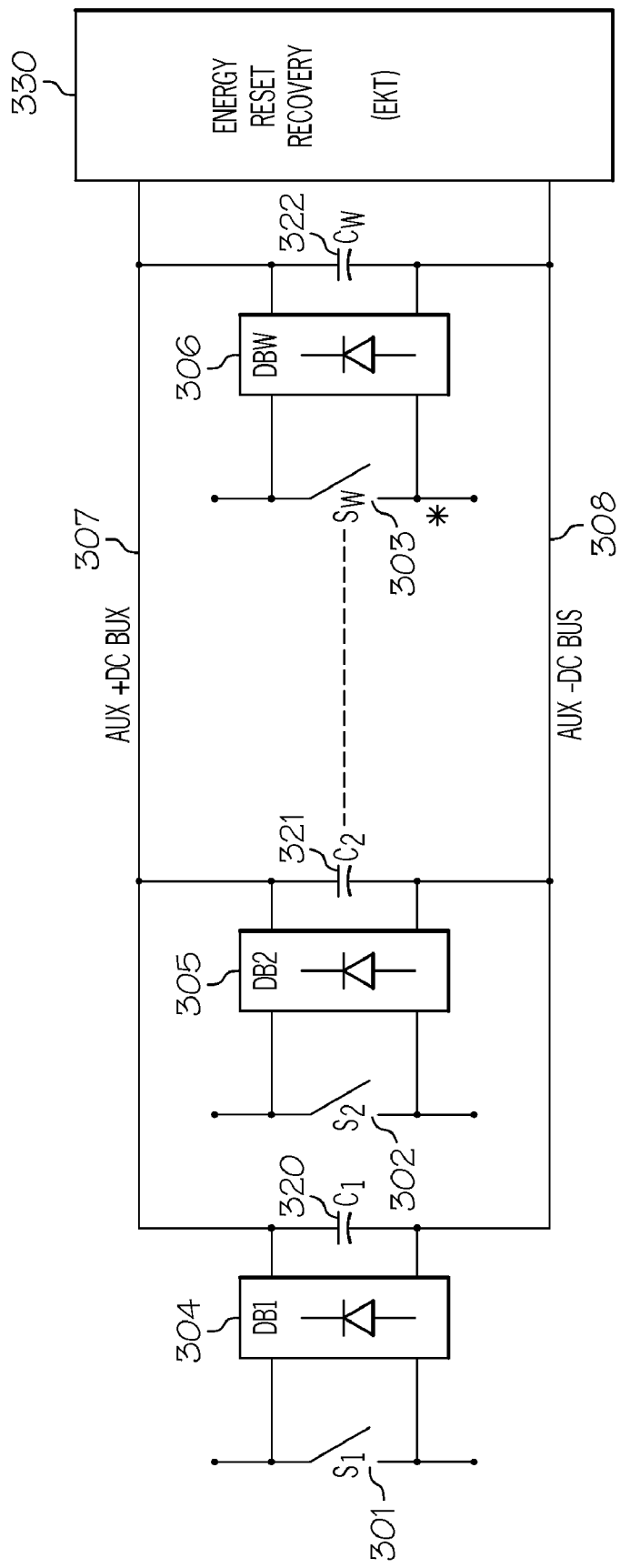
FIG. 4 shows a schematic diagram of an integrated active snubber with an energy recovery circuit, according to the present invention.

Referring now to FIG. 4, an embodiment is shown for integrating all the active-snubbers and use of only one energy reset (comprising an auxiliary switch and resistor, as described in FIG. 3A) or energy recovery circuit 330 (ERC). Small distributed capacitors C1 320 to Cw 322 may be used across the aux +DC bus 307 to the aux −DC bus 308 to minimize stray inductances and a bulk low-inductance high voltage film cap (not shown) may be used inside ERC 330 for temporarily storing recovered commutation energy.

S1 to SW represent the AC Switches (note that W represents the total number of AC Switches, i.e., W=N×M), and DB1 to DBW correspond to the full diode bridges, as shown in FIG. 3A. For example DW1 is comprised of D1 203, D2 204, D3 205, and D4 206, as shown in FIG. 3A.

Figure 5:
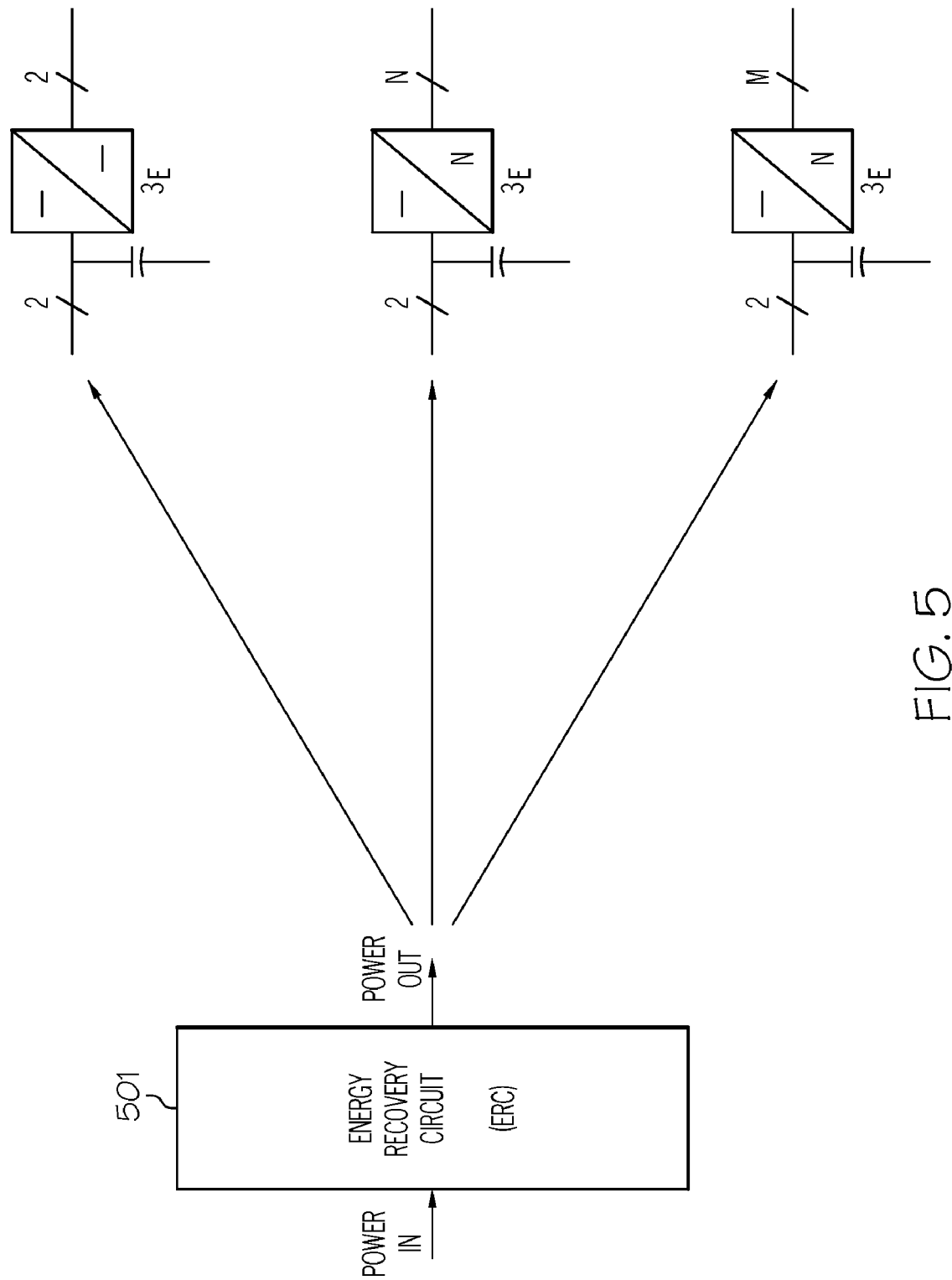
FIG. 5 shows a description of selected options for an energy recovery circuit, according to the present invention.

FIG. 5 provides several ERC 330 options for effectively using the recovered energy in the integrated capacitor arrangement shown in FIG. 4, to achieve one (or more at the same time, as required) of the following advantageous functions: The top option shows the use of a DC-DC converter to convert recovered energy into a regulated DC bus (e.g., 28V DC, 270 DC or ±270 DC, etc) for use of other on-board loads. The middle option shows the use of a DC-AC converter to convert recovered energy for achieving active filtering/damping at input side of the AMC, as further described in FIG. 6. The bottom option shows the use of a DC-AC converter to convert recovered energy for achieving active filtering/damping at output side of the AMC, as further described in FIG. 7. DC-DC converters with or without isolation are known to those skilled and will not be further discussed here.

Figure 6:
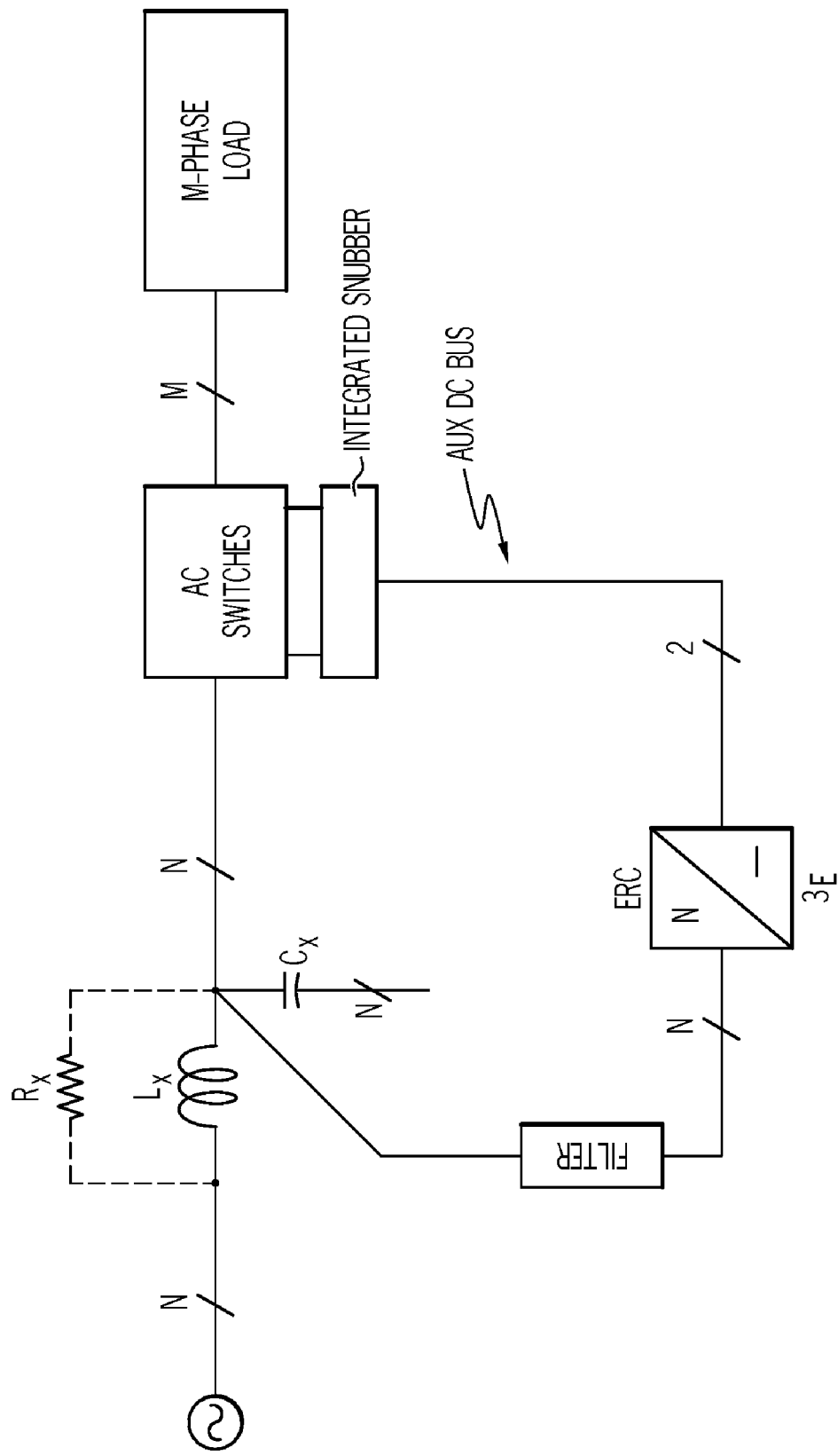
FIG. 6 shows a schematic diagram of a circuit using the DC-AC converter shown in the second option of FIG. 5.
Figure 7:
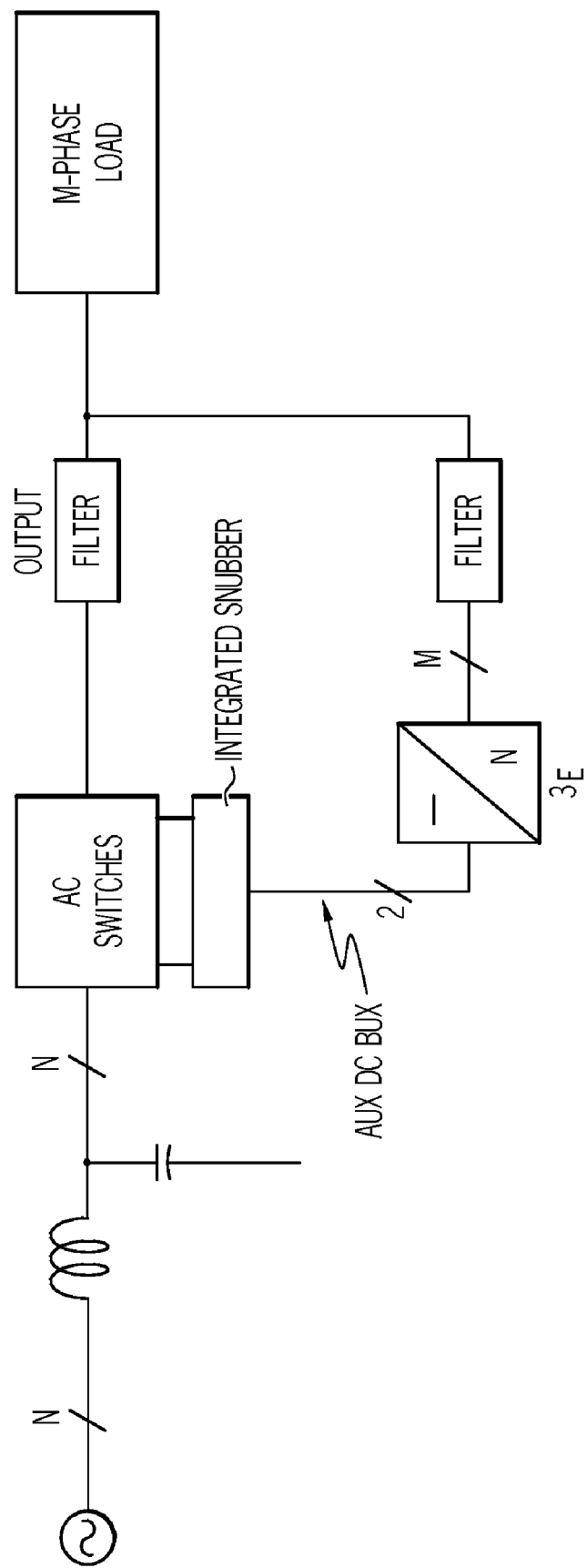
FIG. 7 shows a schematic diagram of a circuit using the DC-AC converter shown in the third option of FIG. 5.

FIGS. 6 and 7 respectively show generalized simplified block diagrams for connecting a DC-AC converter to input (2-N converter) or output (2-M converter) of the AMC for achieving active filtering and/or damping.

As shown in FIG. 6, one advantageous aspect of this invention may result in achieving active damping through ERC. This may eliminate the need for a prior-art resistor (Rx, shown as a dashed line) across the input filter inductor (Lx), used to damp resonant oscillations for Lx/Cx circuits (where x represents different phases a, b, c, d, ... etc). Elimination of the passive damping may result in improved efficiency and may minimize the burden of thermal management which otherwise would result in excessive weight, size and cost penalty.

For example, in a 3-3 AMC, the DC-AC converter may be a three-phase voltage source inverter. This inverter may condition and transfer the recovered energy back to the source and/or load side. In addition to meeting energy efficiency requirements, those skilled in the art appreciate that this approach can be beneficial in meeting power quality requirements as this auxiliary power path can be effectively controlled to provide active filtering for eliminating current harmonics, active damping, achieving active/reactive power control (e.g., unity power factor at input or output and/or voltage boost at input), and ride-through capability, during power interruptions.

Figure 8:
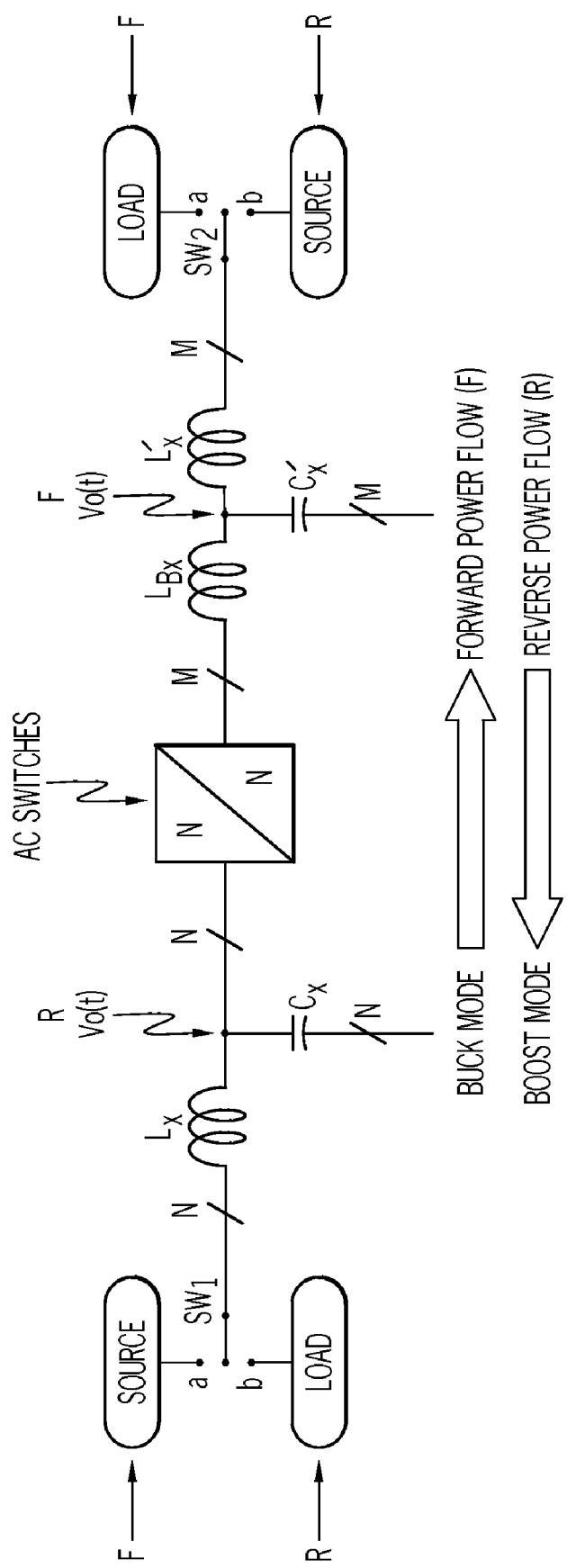
FIG. 8 shows a schematic diagram of an advanced matrix converter (AMC) with buck or boost capability (in forward and reverse directions, respectively), according to the present invention.

Now referring to FIG. 8, according to embodiments of the present invention, operation of the AMC in buck and boost conversion modes can be described. In the buck mode, both sw1 and sw2 switches (included for illustration only) are in position "a" and direction of power flow is from left-to-right, and the AC switches are PWM modulated to obtain an output voltage Vo(t), as shown in FIG. 8. According to the detailed descriptions provided above, the AMC can achieve direct AC-AC converter in the "forward power flow" direction for achieving a buck mode of operation, in which the voltage transfer ratio between input and output rms voltage is less than 1.

Those skilled in the art appreciate that limited voltage boost at the input of an AMC can be achieved, by drawing a leading power factor current from the supply through a series filter inductor. The magnitude of this voltage boost is relatively limited due to constraints from drawing leading power factor from a generator.

Alternatively, voltage boost at a much higher magnitude can be obtained at the load-side as shown in FIG. 8 in the "reverse power flow" direction. In this boost mode, both sw1 and sw2 switches (included for illustration only) are in position "b", and direction of power flow is from right-to-left. LBx (wherein x, changes from 1, 2, 3, etc to represent multiple phases of the source—now on the right-hand-side) may perform as a boost inductor. Those skilled in the art, appreciate that proper control and PWM modulation of the gating patterns for the AMC AC switches, in the reverse mode can result in achieving a higher voltage Vo(t) for the Cx capacitor on the left-hand-side (reciprocal operation of the AMC, i.e. in the reverse power mode). Alternatively, just like the operation of a boost-converter comprised of a DC supply, boost inductor, a controlled switch, a diode and output cap, energy can be stored in the boost inductor and simultaneously supplied to load in-addition to the enrgy supplied from the source. During a turn-on pulse, the controlled switch connects the boost inductor across the source and energy gets stored in the boost inductor. When the controlled device is turned-off, then both the source and the boost inductor provide power to the output cap and the output cap voltage (now on the right-hand-side) can be regulated to a much higher value and is determined by the duty ratio.

Figure 9A:
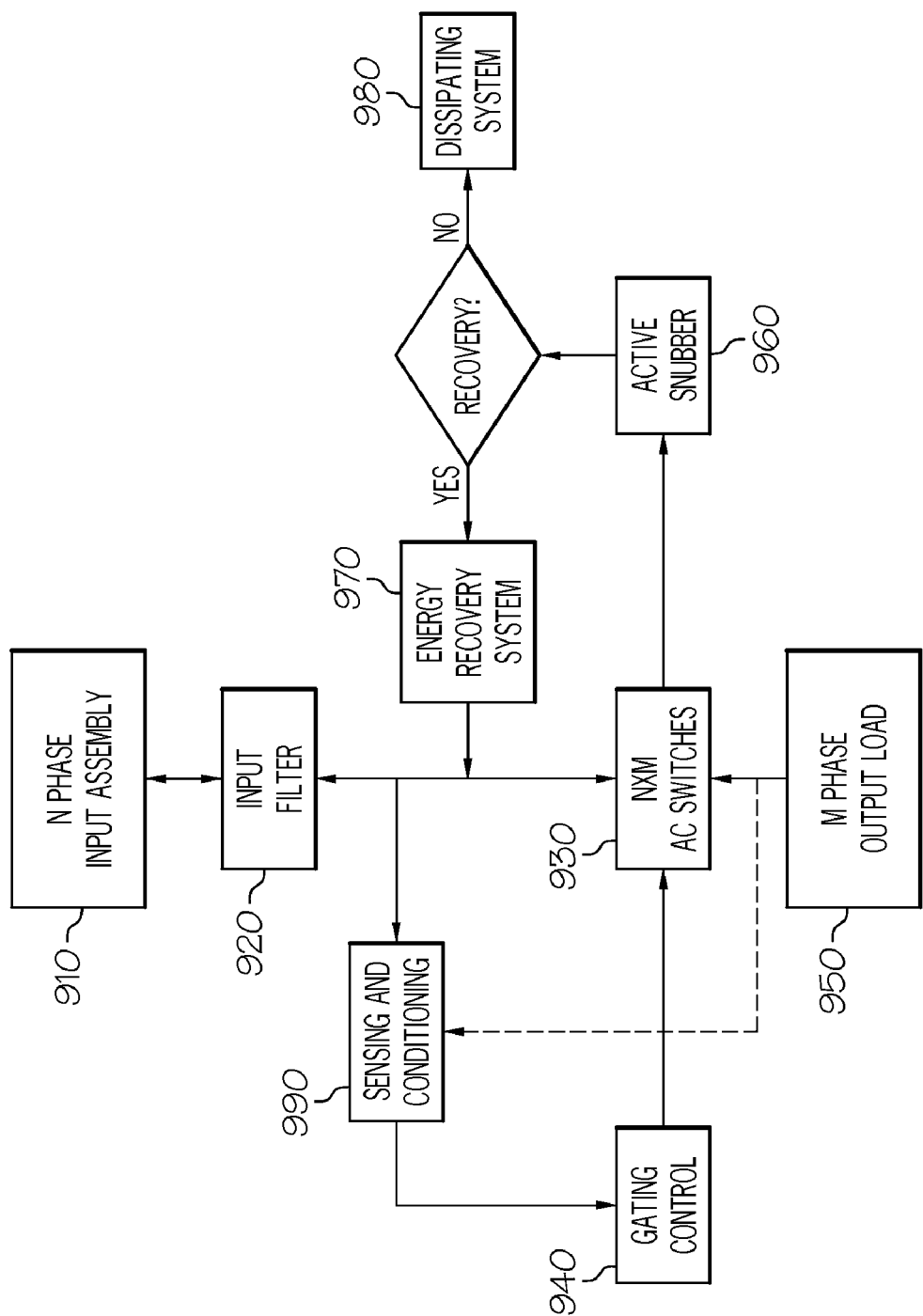
FIGS. 9A and 9B are flow charts describing methods of the present invention.

In one embodiment of the present invention, a method is provided for AC current to load at a controlled frequency. In that regard the method may be understood by referring to FIG. 9A. In FIG. 9A, a flow chart portrays various aspects of an inventive method 900. In a step 910, AC power (e.g., an N-phase AC power system) may be provided to a matrix converter 930. An input filter 920 may be used for meeting power quality and EMI requirements and may further include active or passive damping. In a step 990 various parameters (such as currents, voltage, temperature etc) may be measured from input side and output side required for control and/or PHM (not all measurements shown). In a step 940, AC switches of the matrix converter may be operated (e.g., the AC switches 31, 32, 33 may be operated in accordance with a switching sequence that produces an output from the matrix converter at a desired frequency and voltage according to a given reference voltage suitable for the application at hand). In a step 940, PWM isolated gating signals are generated and may be employed to operate N×M bidirectional set of semiconductor switches, as required. Details of step 940, are further explained in FIG. 9B. After receiving input and output voltages, they are fed to a Phase Lock Loop (941-1 for input and 941-2 for output) and in step 942, sector calculation is carried out to determine, which of the 1-W switches should be closed and in step 943, it is determined what should the duration of each interval when of the AC Switches are closed. Once the duration of on-time for all the N×M switches are known the duration of zero-vectors are calculated and distributed in a symmetrical fashion for achieving optimum gating pattern with desired harmonic spectrum. In Step 945 a short time-delay is introduced to insure that during switching transitions input supply voltages/filter capacitors are not short-circuited. Finally in Step 946, gating signal isolation and voltage level adjustment are introduced to ensure proper turn-on and turn-off of the controlled AC-Switches. These steps should not be taken in a limiting sense, as those skilled in the art appreciate that other features for self powering the gate-drivers, prognostics health monitoring, and various protective measures can be included among other technology items to improve performance and/or facilitate other functionality.

Figure 9B:
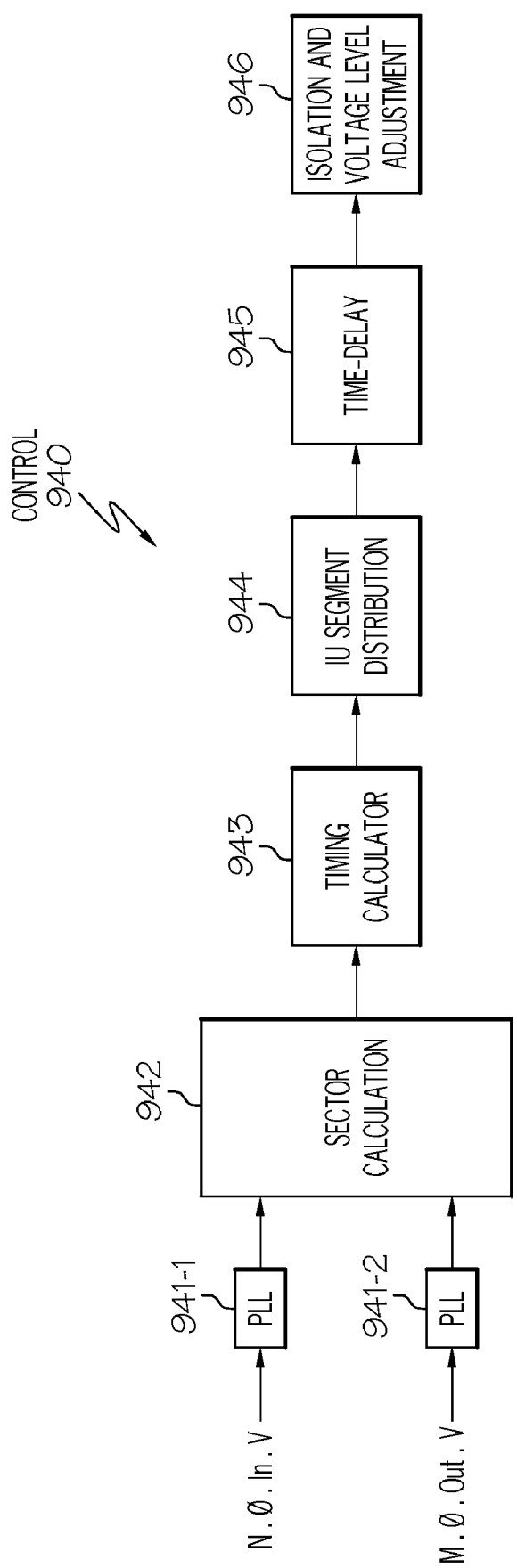

In a step 960, a snubber may be utilized across each of the AC switches 930 and may operate to absorb commutation energy during the time-delay introduced in step 945, as shown in FIG. 9B. In a step 980, the recovered energy stored in the snubber-capacitor may be dissipated through a resistor, either reducing the snubber cap voltage to zero or a reset upper/lower level per detailed bang-bang control described in FIG. 3C. Alternatively, the recovered energy can be fed back either to input or output through an energy recover circuit, as described in detail in the invention (for simplicity of demonstrating the method, energy recovery to input side is only shown). Finally, in a step 950, the matrix converter may be operated to supply conditioned power to a an M-phase load, at a desired frequency and voltage level depending on the application.

It should be understood, of course, that the foregoing relates to exemplary embodiments of the invention and that modifications may be made without departing from the spirit and scope of the invention as set forth in the following claims

I claim:

1. A matrix converter comprising:
 a plurality of at least N by M (N×M) bidirectional alternating current (AC) switches, wherein
 N corresponds to the number of AC system phases at an input of the matrix converter and M corresponds to the number of required phases at an output of the matrix converter,
 each of the AC switches includes a bi-directional set of semiconductor switches coordinated to operate sequentially with a time-delay between sequential operations, each of the semiconductor switches having a common gating pattern; and
 a snubber absorbing energy during the time delay where all the N switches of one of the M blocks are in the off-position.

2. The matrix converter of claim 1 comprising:
 three-phase inputs; and
 three-phase outputs, wherein;
 a desired frequency and voltage of output of the matrix converter is produced by operation of gate driver signals for the bi-directional set of semiconductor switches of the matrix converter.

3. The matrix converter of claim 1 further comprising: a time-delay incorporated for the AC switches; the time-delay is introduced at every turn-on of their respective AC switches to prevent short-circuit of the source-side AC phases.

4. The matrix converter of claim 1, including a snubber circuit across each of the AC switches to deter current chopping by ensuring that no open-circuit condition occurs at an output side of the matrix converter.

5. The matrix converter of claim 1 wherein the snubber comprises:
 a diode-bridge;
 a capacitor;
 a resistor; and
 an auxiliary switch resulting in a dissipative energy discharge circuit connected in series between positive and negative terminals of the diode-bridge and allowing to regulate the capacitor within an upper-lower voltage level through a bang-bang control.

6. The matrix converter of claim 1, further comprising an energy recovery circuit, wherein the energy recovery circuit is one of a) a DC-DC converter to convert recovered energy into a regulated DC bus for use of other loads; b) a DC-AC converter to convert recovered energy for achieving active filtering/damping at an input side of the matrix converter; or c) a DC-AC converter to convert recovered energy for achieving active filtering/damping at an output side of the matrix converter.

7. The matrix converter of claim 1, wherein the semiconductor switches are MOSFET-Based AC switches with multiple MOSFETS in parallel resulting in reduction of Rds, wherein the MOSFET-Based AC switches have the ability to operate at high switching frequency.

8. A method for providing electrical power at a desired controlled frequency and voltage from a variable voltage variable frequency source, comprising the steps of:
 supplying AC power to a matrix converter;
 operating multiple semiconductor switches simultaneously with common gating;
 introducing time-delay between successive operations of the semiconductor switches to preclude short-circuit of supply voltages or open circuit conditions at an output of the matrix converter;
 absorbing energy in at least one diode-bridge based snubber during the time-delay, wherein each of said snubbers can work individually independent from each other, or integrated together to form a common Aux DC Bus, with common bus voltage and energy recovery circuit.

9. The method of claim 8 further comprising the step of managing stored energy, in which the recovered energy from the individual snubbers or an integrated snubber system with one common auxiliary DC Bus can be either a) dissipated in an individual/integrated snubber resistor or b) recovered by an energy recovery circuit.

10. The method of claim 8 wherein electrical power is provided from the source as three-phase power; and
 wherein a desired output voltage at a certain frequency is produced with nine gating signals as a minimum for each cycle of operation of the matrix converter.

11. The method of claim 10 wherein the matrix converter operates with snubber gating patterns which are either the same as gating patterns for the sets of bi-directional semiconductors, when it is intended to fully discharge the capacitor voltage, or are determined in such a way to regulate the Aux DC Bus voltage well above natural rectification of the AC system to minimize energy flow to and circulation into the snubber circuit.

\* \* \* \* \*